United States Patent [19]

Kühnel et al.

[11] 4,366,114
[45] Dec. 28, 1982

[54] DRY STORAGE FOR SPENT FUEL ASSEMBLIES

[75] Inventors: Roland Kühnel, Dietzenbach; Rainer Bokelmann, Offenbach; Magnus Scholz, Korschenbroich; Klaus Gebke, Gelnhausen; Mariana Schüler, Offenbach, all of Fed. Rep. of Germany

[73] Assignee: Kraftwerk Union AG, Mulheim an der Ruhr, Fed. Rep. of Germany

[21] Appl. No.: 169,633

[22] Filed: Jul. 16, 1980

[30] Foreign Application Priority Data

Jul. 20, 1979 [DE] Fed. Rep. of Germany ....... 2929467

[51] Int. Cl.³ ............................................. G21C 19/00
[52] U.S. Cl. .................................. 376/272; 250/506.1
[58] Field of Search .................. 176/30; 250/506, 507, 250/518, 519; 376/272

[56] References Cited

U.S. PATENT DOCUMENTS

| | | | |
|---|---|---|---|
| 2,992,175 | 7/1961 | Borst | 250/518 |
| 3,663,817 | 5/1972 | Sayers | 250/506 |
| 4,040,480 | 8/1977 | Richards | 250/506 |

*Primary Examiner*—Donald P. Walsh
*Attorney, Agent, or Firm*—Herbert L. Lerner; Laurence A. Greenberg

[57] ABSTRACT

Dry storage system for spent nuclear-reactor fuel assemblies including a building having an interior secured against external influence, devices disposed in the building for removing from shipping containers, by remote control, spent fuel assemblies delivered in the shipping containers into the building and for enclosing the fuel assemblies in gas-tight storage boxes as well as filling the remaining space in the storage boxes with heat-conducting medium, at least one storage chamber in the building having therein storage racks for supporting the fuel-element storage boxes in horizontal stacks, a transporting device movable into respective coordinate positions for stacking the fuel-element storage boxes horizontally in the storage racks, and heat removing devices disposed in outer walls of the building for providing natural air circulation through the storage racks.

7 Claims, 3 Drawing Figures

DRY STORAGE FOR SPENT FUEL ASSEMBLIES

The invention relates to a dry storage system for burned-off or spent fuel assemblies of nuclear reactors and, more particularly, to such spent fuel assemblies as are enclosed in gas-tight storage boxes or cases. During operation of nuclear power plants, especially those which are equipped with light-water reactors, the necessity arises of removing, after an extended decay period, the fuel assemblies which have been stored in the interim in storage pools in the reactor building if these pools are filled. This is necessary in order to provide new storage space for the next fuel-assembly exchange, which normally occurs annually, or in order to make ready the spent fuel assemblies for further reprocessing. Should bottlenecks occur at this point, the operation of nuclear power plants would be endangered. It should be noted in this regard that the possibility of storing spent fuel assemblies outside the building is attaining ever increasing importance.

Storage buildings have already been proposed heretofore wherein the fuel assemblies are stored in water-filled pools. With them, however, expensive systems for cooling and cleaning the pool water for the purpose of removing decomposition heat are required. Also, the cooling-water demand must be reliably satisfied. Plans or proposals are further known which are concerned with dry storage of fuel assemblies. They are all of the same basic type and do not include, for example, the safety-engineered devices necessary for such equipment or installations. In this regard, attention is directed to the proposals contained in German Published Non-Prosecuted Application (DE-OS) Nos. 27 53 034 and 28 23 376.

It is accordingly an object of the invention to provide a dry storage system for spent fuel assemblies with which also all devices relating to manipulation or operating technology and to safety engineering are integrated.

With the foregoing and other objects in view there is provided, in accordance with the invention, a dry storage system for spent nuclear-reactor fuel assemblies, comprising a building having an interior secured against external influence, devices disposed in the building for removing from shipping containers, by remote control, spent fuel assemblies delivered in the shipping containers into the building and for enclosing the fuel assemblies in gas-tight storage boxes as well as filling the remaining space in the storage boxes with heat-conducting medium, at least one storage chamber in the building having therein storage racks for supporting the fuel-element storage boxes in horizontal stacks, a transporting device movable into respective coordinate positions for stacking the fuel-element storage boxes horizontally in the storage racks, and heat removing devices disposed in outer walls of the building for providing natural air circulation through the storage racks.

In accordance with another feature of the invention, the heat removing devices are multiply redundant and are coolable by natural draft outside the building.

In accordance with a further feature of the invention, the heat removing devices are formed of heating tubes.

In accordance with an added feature of the invention, the heat removing devices are formed of heat exchangers having a closed thermal liquid-circulatory system.

In accordance with an additional feature of the invention, the heat removing devices are formed of heat exchangers having a vaporization and condensation system.

In accordance with yet another feature of the invention, the dry storage system includes normally closed air conducting channels disposed in floor and ceiling regions of the storage chamber, the air conducting channels, in the event of partial failure of the heat removing devices, being operable for maintaining the air circulation through those of the heat removing devices remaining intact.

In accordance with a concomitant feature of the invention, the heat-conducting medium is a solid or a gas.

Other features which are considered as characteristic for the invention are set forth in the appended claims.

Although the invention is illustrated and described herein as embodied in a dry storage for spent fuel assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
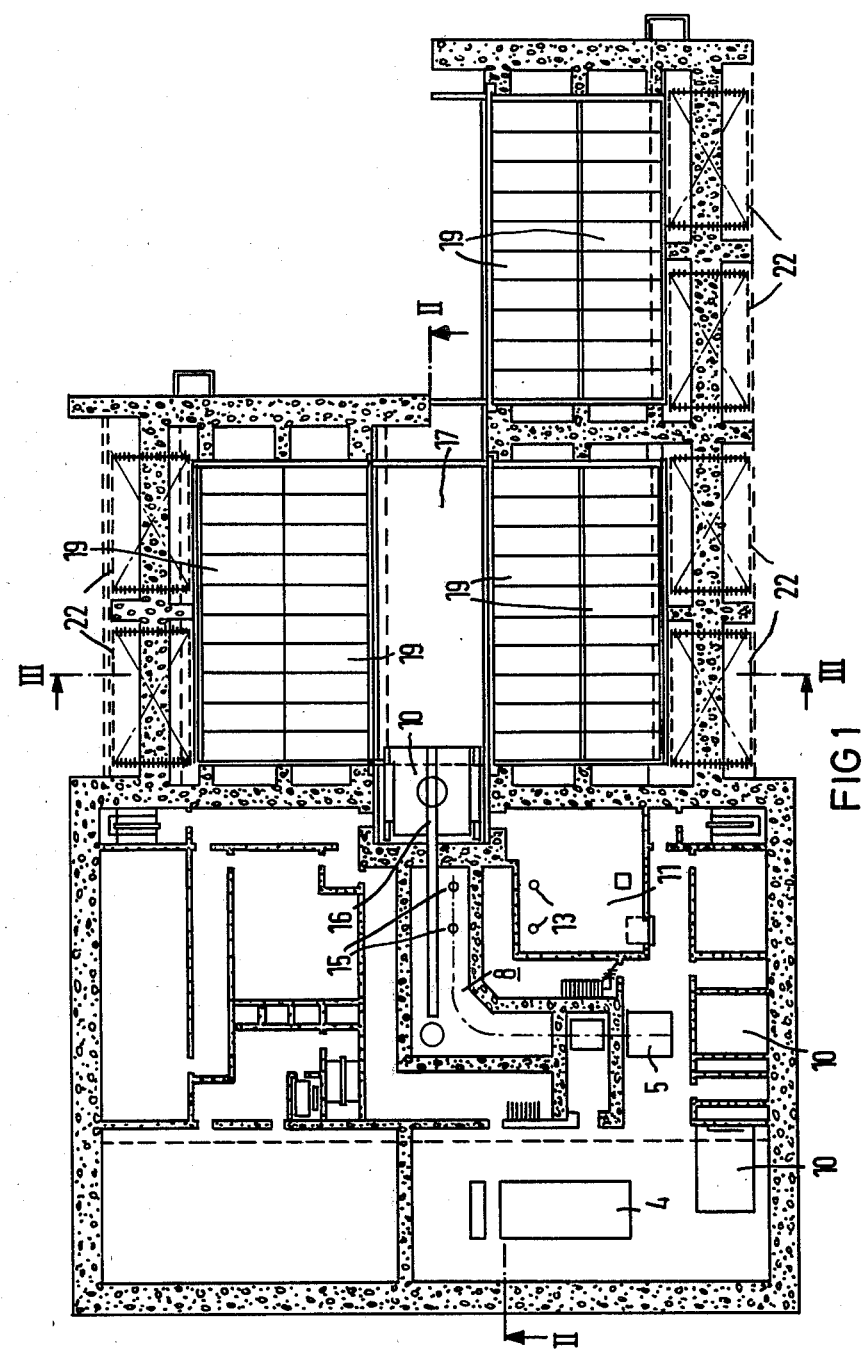
FIG. 1 is a sectional view of the storage building according to the invention taken along a horizontal plane at the second story of the building.
Figure 2:
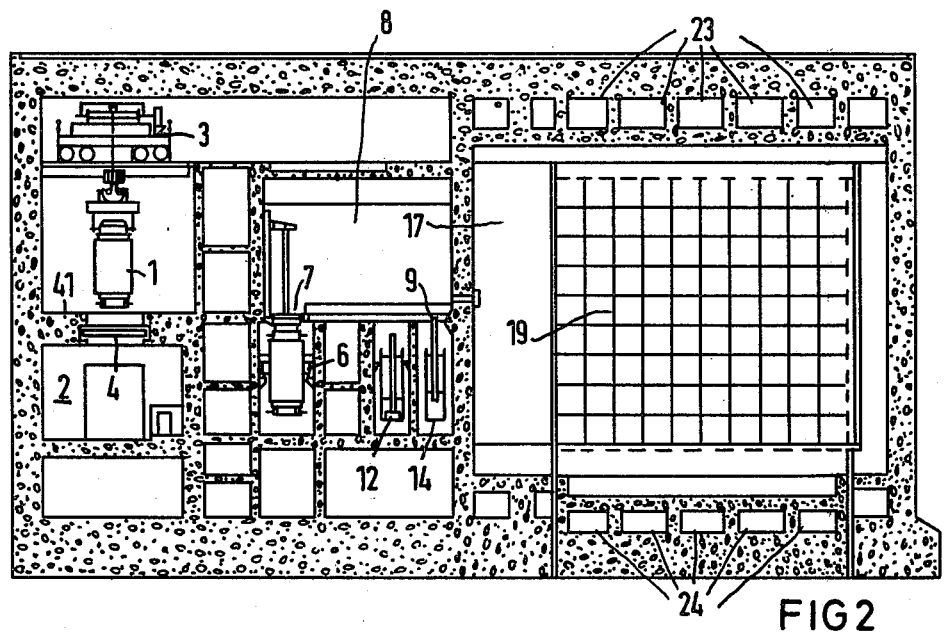
FIG. 2 is a vertical sectional view of FIG. 1 taken along the line II—II in direction of the arrows.
Figure 3:
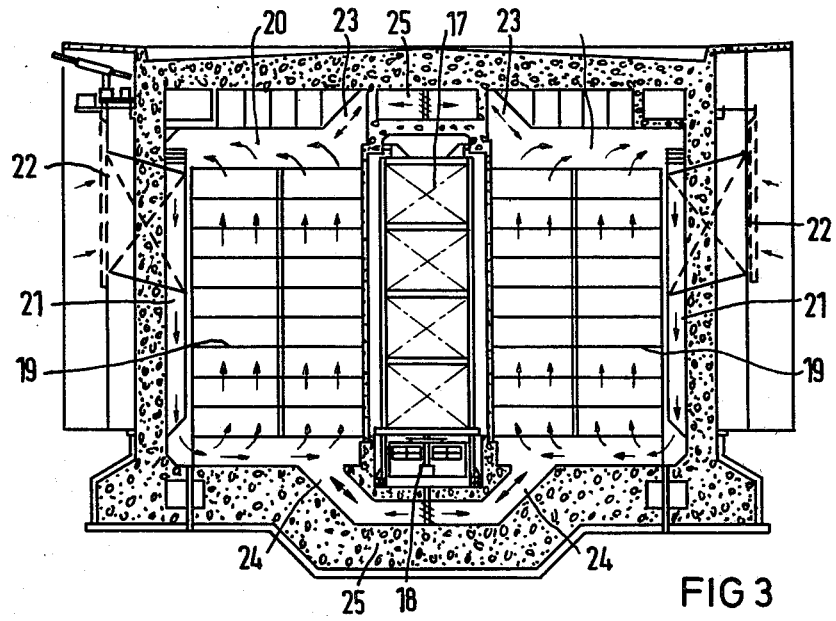
FIG. 3 is also a vertical sectional view of FIG. 1, however, taken along the line III—III in direction of the arrows.

The construction of the illustrated storage building is hereinafter described with reference to the movement of a fuel assembly delivered thereto as it passes through various make-ready stations until it reaches the dry storage place per se.

Referring now to the figures of the drawing, there is shown therein a shipping container 1 containing at least one spent fuel assembly and arriving by rail or road, the shipping container 1 being introduced through an entry lock 2 into the building. By means of a crane unit 3, the shipping container 1 is righted and raised through a lock opening 4 to a service plane or level 41. The container 1 is then inserted through another opening 5 formed in the service plane 41 into a suspended conveyor or carriage. The latter then travels to an unloading location 7 below an unloading cell or chamber 8. Initially, the cover of the shipping container 1 is opened thereat, possibly only after additional cooling thereof or depressurizing of the interior thereof, and the contents in the form of one or more fuel assemblies 9 are removed therefrom by means of conventional non-illustrated mechanical devices. The then empty shipping container 1 is then transported back along the same path, possibly after decontamination in a special decontamination installation 10, and after leaving the entry lock 2, is reloaded onto the shipping or transportation means therefor.

Since the fuel assemblies 9 may be contaminated at the outside thereof and may possibly have slight damage, they are air-tightly packed before being seated or stored in respective boxes or canisters 12. The boxes 12 are taken from a box storage place 11 and introduced at locations 13 into downwardly traveling conveyor devices 14. The latter then travel with the boxes 12 introduced therein to stations 15 of the unloading cell 8 whereat the fuel assemblies 9, which had been previously removed from the shipping containers 1, are inserted, respectively, into the boxes 12. The empty space remaining in the boxes 12 are advantageously filled with an heat-conductive granular material such as graphite for example, to which absorber material may also be added, or with a gas. Thereafter, the boxes 12 are gas-tightly closed or sealed at the stations 15 and tested or checked by conventional methods for leaks or as to the tightness thereof. After this operation, the boxes 12 with the fuel assemblies 9 enclosed therein are raised in the unloading cell 8 and placed on a roll table or roller bed 16 by the aid of which they are introduced through additional non-illustrated locks into the storage chamber 17 per se.

In the storage chamber 17, a transporting device 18 capable of traveling horizontally and vertically i.e. in coordinates, takes over the boxes 12 and places them into the respective storage locations of storage racks 19. The storage racks 19 are constructed in the form of a block open only at the top and bottom thereof, so that the heat developing from the fuel assemblies communicates above the boxes 12 with the circulating air which then rises through the block of the storage racks 19 into upper free space 20. From the free space 20, the air flows downwardly again into gaps or intermediate spaces 21 between the building wall and the storage block 19, the air passing over or transfering the heat absorbed from the fuel assemblies 1 to heating tubes 22 projecting into these gaps or spaces 21. These heating tubes 22 penetrate the walls of the storage building and surrender the absorbed heat to the circulating air located outside thereof. The inner air, which has cooled off in the gap or space 21, then flows in a natural circulation again through the storage rack 19 and removes the heat of decomposition of the fuel assemblies without having to use any additional energy. Instead of the heating tubes 22, heat exchangers may also be used with a closed thermal liquid circulatory system or a vaporization and condensation system, with heat exchanger surfaces disposed inside and outside the building walls.

In the event of a partial failure of the heat removing devices 21, whether they be heating tubes or heat exchangers, air conducting channels 23 and 24, which are normally closed by flaps, are provided in the floor and ceiling regions 25 of the storage chambers 17 for maintaining the air circulation through the yet intact heat conducting devices. Depending upon the direction of circulation necessary as a result of the damage or failure that may have occurred, these flaps are opened in order to ensure the air circulation in the entire storage space. This is possible because the heat conducting devices 22 are overdimensioned or oversized in a redundant manner.

The entire storage building is of such stable or strong construction that it can also withstand very great loads from the outside such as, for example, an airplane crash. In a manner similar to nuclear power plants, a double, concrete surrounding shell or wall is possible as well as an entirely or partially underground type of construction. In the latter case, it would then only be necessary to build the heat removing devices into the interior of air-draft chimneys as has been proposed heretofore in German Published Non-Prosecuted Application (DE-OS) No. 28 23 376.

It should also be noted that the storage boxes 12 are dimensioned in accordance with the size and shape of the respective fuel assemblies 9 which are to be received therein. Thus, for example, spherically shaped fuel assemblies, as find application for gas-cooled nuclear reactors, could be placed into a graphite heap or also glass cylinder, as occurs in the conditioning of highly active wastes from reprocessing. Due to the type of packing in air-tight boxes, contamination of the storage space per se is virtually eliminated or excluded, and because of the construction, known heretofore, of the heat conductive devices, they, moreover, provide a double closure from the outside, so that also, from that feature, contamination of the surroundings can be reliably excluded. Although it may be obvious, it is nevertheless noted that the storage of the fuel assemblies is provided geometrically so that no critical mass can develop. This is also additionally assured, in a conventional manner, in that neutron-absorbing materials are used in sufficient amount, on the one hand, for the storage rack per se and, on the other hand, also for the heat conducting substance with which the fuel-assembly boxes are filled.

We claim:

1. Storage building with gas-tight storage boxes for spent nuclear-reactor fuel assemblies, the building having an interior secured against penetration from the outside, devices disposed in said building for removing from shipping containers, by remote control, spent fuel assemblies delivered in said shipping containers into said building and for enclosing the fuel assemblies in the gas-tight storage boxes, and at least one storage chamber in said building having therein storage racks for supporting said fuel-element storage boxes, comprising a transporting device movable into respective horizontal and vertical coordinate positions for stacking said fuel-element storage boxes horizontally in said storage racks, said storage boxes containing heat-conducting medium in addition to the fuel assemblies, and heat removing devices disposed in an outer wall of said building for providing natural air circulation through said storage racks, said heat removing devices being connected with said storage chamber and extending to the outside.

2. Storage building according to claim 1 wherein said heat removing devices are multiply redundant and are coolable by natural draft outside said building.

3. Dry storage system according to claim 1 or 2 wherein said heat removing devices are formed of heating tubes.

4. Dry storage system according to claim 1 or 2 wherein said heat removing devices are formed of heat exchangers having a closed thermal liquid-circulatory system.

5. Dry storage system according to claim 1 or 2 wherein said heat removing devices are formed of heat exchangers having a vaporization and condensation system.

6. Dry storage system according to claim 1 including normally closed air conducting channels disposed in floor and ceiling regions of said storage chamber, said air conducting channels, in the event of partial failure of said heat removing devices being openable for maintaining said air circulation through those of said heat removing devices remaining intact.

7. Storage building according to claim 1 wherein said heat-conducting medium is a solid or a gas.

* * * * *